(12) United States Patent
Plate

(10) Patent No.: US 8,782,603 B2
(45) Date of Patent: Jul. 15, 2014

(54) STANDARDIZED CONFIGURATION CHECKLISTS FOR SOFTWARE DEVELOPMENT

(75) Inventor: Henrik Plate, Nice (FR)

(73) Assignee: SAP AG, Walldorf (DE)

( * ) Notice: Subject to any disclaimer, the term of this patent is extended or adjusted under 35 U.S.C. 154(b) by 762 days.

(21) Appl. No.: 12/974,812

(22) Filed: Dec. 21, 2010

(65) Prior Publication Data
US 2012/0159438 A1    Jun. 21, 2012

(51) Int. Cl.
| G06F 9/44 | (2006.01) |
| G06F 17/00 | (2006.01) |
| H04L 29/08 | (2006.01) |
| G06F 21/56 | (2013.01) |
| H04L 29/06 | (2006.01) |
| G06F 21/51 | (2013.01) |
| G06F 9/445 | (2006.01) |

(52) U.S. Cl.
CPC ............ *G06F 9/44505* (2013.01); *H04L 67/34* (2013.01); *G06F 21/563* (2013.01); *H04L 63/1433* (2013.01); *G06F 21/51* (2013.01)
USPC .................. 717/121; 717/123; 726/1

(58) Field of Classification Search
None
See application file for complete search history.

(56) References Cited

U.S. PATENT DOCUMENTS

| 7,516,476 B1 * | 4/2009 | Kraemer et al. .................. 726/1 |
| 7,788,640 B2 * | 8/2010 | Grimaldi ...................... 717/123 |
| 8,307,341 B2 * | 11/2012 | Eykholt ....................... 717/123 |
| 2006/0031819 A1 * | 2/2006 | Oikawa ........................ 717/123 |
| 2006/0143594 A1 * | 6/2006 | Grimaldi ....................... 717/123 |
| 2006/0253841 A1 * | 11/2006 | Rioux ........................... 717/127 |
| 2006/0288401 A1 * | 12/2006 | Wilson ............................. 726/1 |
| 2007/0083933 A1 * | 4/2007 | Venkatapathy et al. ........ 726/25 |
| 2007/0226259 A1 * | 9/2007 | Kacin et al. ................. 707/104.1 |
| 2008/0028371 A1 * | 1/2008 | Brothers et al. ............. 717/136 |
| 2008/0256516 A1 * | 10/2008 | Chaar et al. .................... 717/121 |
| 2009/0077621 A1 * | 3/2009 | Lang et al. ......................... 726/1 |
| 2009/0210858 A1 * | 8/2009 | Son et al. ...................... 717/121 |
| 2009/0319993 A1 * | 12/2009 | Denver et al. ................. 717/121 |
| 2010/0192194 A1 * | 7/2010 | Tan et al. ........................... 726/1 |

OTHER PUBLICATIONS

Gilliam et al. Security Risks: Management and Mitigation in the Software Life Cycle. 13th IEEE International Workshops on Enabling Technologies: Infrastructure for Collaborative Enterprises, Jun. 2004, pp. 211-216, Retrieved on [May 2, 2014] Retrieved from the Internet: URL<http://ieeexplore.ieee.org/stamp/stamp.jsp?tp=&arnumber=1376835>.*

(Continued)

*Primary Examiner* — Thuy Dao
*Assistant Examiner* — Cheneca Smith
(74) *Attorney, Agent, or Firm* — Fish & Richardson P.C.

(57) ABSTRACT

Implementations of the present disclosure include methods for generating a configuration checklist template. In some implementations, methods include retrieving one or more source code files, each of the one or more source code files corresponding to a software product, scanning the one or more source code files to generate one or more configuration check building blocks, receiving first user input, processing the one or more configuration check building blocks and the first user input to generate one or more check definitions, receiving second user input, processing the one or more check definitions and the second user input to generate the configuration checklist template, electronically storing the configuration checklist template, and transmitting the configuration checklist template to one or more computing devices associated with a customer entity over a network.

11 Claims, 5 Drawing Sheets

(56) References Cited

OTHER PUBLICATIONS

Plosch et al.The EMISQ Method—Expert Based Evaluation of Internal Software Quality. 31st IEEE Software Engineering Workshop, 2007, pp. 99-108, Retrieved on [May 2, 2014] Retrieved from the Internet: URL<http://ieeexplore.ieee.org/stamp/stamp.jsp?tp=&arnumber=4402769>.*
*OVAL—Open Vulnerability Assessment Language*, retrieved Oct. 10, 2010, from http://oval.mitre.org/index.html, 3 pages.
*Java Configuration API*, retrieved Oct. 10, 2010, from http://commons.apache.org/configuration/, 1 page.
Sun Microsystems, *JDK 5.0 Preferences-related APIs & Developer Guides*, retrieved Oct. 10, 2010, from http://java.sun.com/j2se/1.5.0/docs/guide/preferences/index.html, 6 pages.
*Norton Security—Antivirus Software*, retrieved Oct. 10, 2010, from www.symantecstore.com/antivirus/norton-cleansweep-a.html, 3 pages.
Microsoft, *Server and Cloud Platform*, retrieved Oct. 10, 2010, from http://www.microsoft.com/systemcenter/configurationmanager/en/us/default.aspx, 2 pages.
SAP AG, *Solution Monitoring and* Management, retrieved Oct. 10, 2010, from http://www.sap.com/platform/netweaver/components/solutionmanager/index.epx, 2 pages.
Java, *Annotations*, retrieved Oct. 10, 2010, from http://java.sun.com/j2se/1.5.0/docs/guide/language/annotations.html, 4 pages.
*Eclipse*, retrieved Oct. 10, 2010, from http://www.eclipse.org, 3 pages.
Zend Technologies, Inc., *PPH IDE: Creation Review*, Eclipse, Mar. 8, 2006, 10 pages.
SAP AG, *SAP Security Optimization Service: Information Sheet*, 2006, retrieved Oct. 10, 2010, from http://service.sap.com/sos, 4 pages.

* cited by examiner

STANDARDIZED CONFIGURATION CHECKLISTS FOR SOFTWARE DEVELOPMENT

BACKGROUND

In operations security, information technology (IT) users and administrators deal with the secure set-up of computer systems. The secure set-up of computer systems can concern upgrade and patch management of software to check that installed components include the latest security patches. The secure set-up of computer systems can also concern secure software configuration settings, to check, for example, whether a personal firewall has been deactivated or a virus signature list is updated in an automated fashion. The security domain "operations security" is relevant for both end-user computers and servers.

Current tools for operations security are mostly proprietary and focus on software of a particular vendor (e.g., central management of front-end virus scanners, upgrade and patch management of components). Slowly, proprietary solutions have begun to adapt to recently developed standards for end-point security validation. These standards enable the creation of standardized checks, independent of specific vendors or products. A repository of standardized checks can be maintained by a sponsoring organization for a variety of products.

Check definitions (e.g., provided in extensible mark-up language (XML)) are created a-posteriori. Accordingly, a knowledgeable person creates a check definition for a given, already shipped product, based on the particular product knowledge of that person. Such a knowledgeable person can include a system or security administrator who is in charge of managing a certain landscape, and is required to reverse engineer the product. That is, the administrator would need to identify security-relevant configurations and their storage location (e.g., in registry entries, configuration files, environment variables). The knowledgeable person can also be a developer of the product vendor. In such a case, the person can typically access the required information more easily, but still does this manually.

In any case, administrator or developer, the creation of a comprehensive checklist of all security-relevant configuration settings is a time-consuming, laborious and erroneous process, particularly when considering complex industry or business solutions that include hundreds of single components. Consequently, operations security processes and technologies are not very effective and either result in undetected, exploitable security vulnerabilities or decrease of efficiency and total cost of ownership (TCO).

SUMMARY

Implementations of the present disclosure include computer-implemented methods for generating a configuration checklist template. In some implementations, methods include retrieving one or more source code files, each of the one or more source code files corresponding to a software product, scanning the one or more source code files using one or more computing devices to generate one or more configuration check building blocks, receiving first user input, processing the one or more configuration check building blocks and the first user input to generate one or more check definitions, receiving second user input, processing the one or more check definitions and the second user input to generate the configuration checklist template, electronically storing the configuration checklist template in a computer-readable storage medium, and transmitting the configuration checklist template to one or more computing devices associated with a customer entity over a network.

In some implementations, scanning includes scanning the one or more source code files to identify read and write access to each configuration setting provided in the one or more source code files.

In some implementations, transmitting further includes transmitting one or more software product artifacts to the customer entity over the network, the one or more software product artifacts being installable on a target platform of the customer.

In some implementations, each of the one or more configuration check building blocks includes a list of one or more configuration objects and one or more potential states associated with each of the one or more configuration objects.

In some implementations, each of the one or more check definitions comprises a textual description of security vulnerabilities associated with one or more configuration objects.

In some implementations, each of the one or more check definitions corresponds to a standard. The standard includes the Open Vulnerability and Assessment Language (OVAL) standard.

In some implementations, methods further include providing each of the one or more configuration check building blocks for display, and receiving third user input, the third user input including textual information that cannot be directly derived from the one or more source code files, the textual information describing how a configuration relates to security, the one or more check definitions including the textual information.

In some implementations, scanning is based on explicit annotations that are embedded into each of the one or more source code files.

In some implementations, scanning is based on accessing to one or more defined configuration application program interfaces (APIs) determinable from the one or more source code files.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to the generation of security configuration checklists during development of an associated software product. Implementations of the present disclosure further provide for the generation of security configuration checklists to be done in an automated process to ensure completeness and correctness of the checks and checklists. As a result, software products sold by software vendors can include an additional artifact, namely a configuration checklist template. Accordingly, implementations of the present disclosure address a fundamental problem, which is the manner in which standardized checks are created.

As noted above, the security domain "operations security" is relevant for both end-user computers and servers. However, and solely for the purpose of illustration, the present disclosure includes examples related to endpoint security, which deals with the end-user computer. Endpoint security is important in private environments, but especially in business environments, where hundreds of employees work with business-critical systems. In such business environments, the exploitation of a single security vulnerability of a single employee computer can be sufficient to compromise the information assets of an organization.

Figure 1:
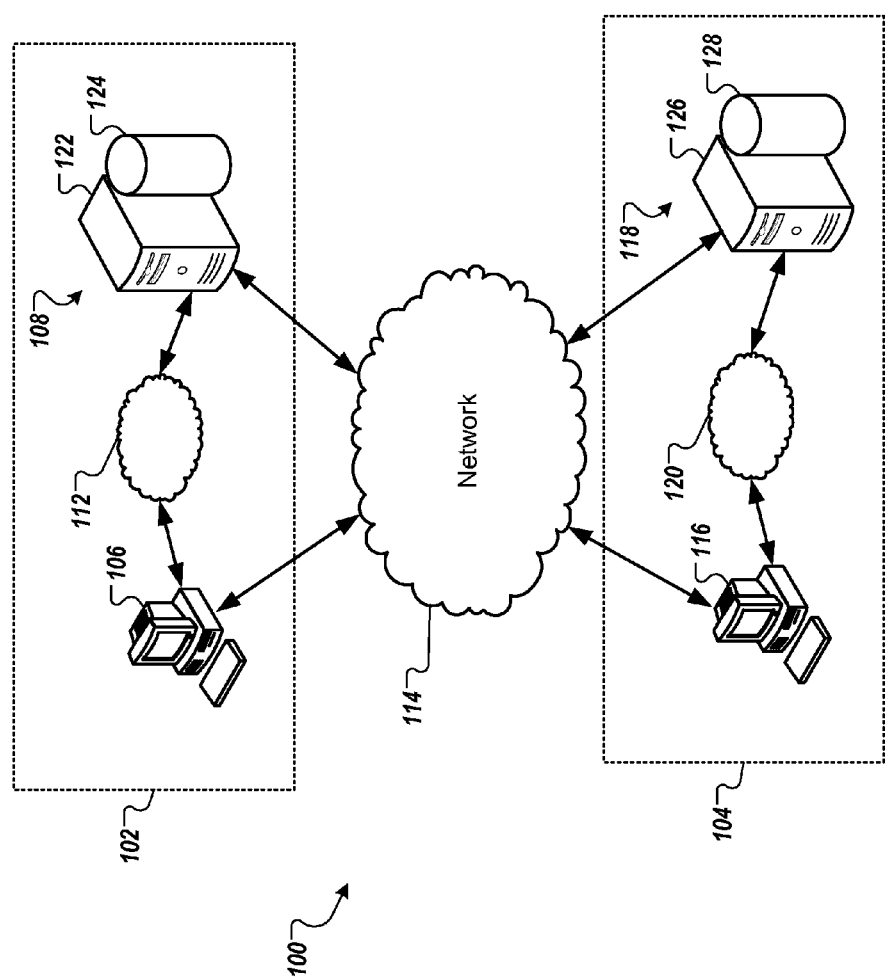
FIG. 1 is a block diagram of an example architecture in accordance with implementations of the present disclosure.

Referring now to FIG. 1, a block diagram depicts an example architecture 100 that can be used in accordance with implementations of the present disclosure. The example architecture 100 includes a software vendor entity 102 and a customer entity 104. The software vendor entity 102 includes one or more computing devices 106 and one or more computing systems 108. The one or more computing devices 106 and the one or more computing systems 108 can communicate with each other through an internal network 112, and/or a network 114. The customer entity 104 includes one or more computing devices 116 and one or more computing systems 118. The one or more computing devices 116 and the one or more computing systems 118 can communicate with each other through an internal network 120, and/or the network 114. The one or more computing devices 106 and/or the one or more computing systems 108 of the software vendor entity 102 can communicate with the one or more computing devices 116 and/or the one or more computing systems 118 of the customer entity 104 through the network 114, the internal network 112 and/or the internal network 120. The one or more computing systems 108 can include a computing device 122 (e.g., a server) and one or more computer-readable storage devices 124 (e.g., a database). The one or more computing systems 118 can include a computing device 126 (e.g., a server) and one or more computer-readable storage devices 128 (e.g., a database).

Each computing device 106, 116 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. The computing devices 106, 116 may be provided access to and/or receive application software executed and/or stored on the computing systems 108, 118.

The computing devices 126, 128 can represent various forms of servers including, but not limited to a web server, an application server, a proxy server, a network server, or a server farm. For example, the computing devices 126 can be an application server that executes software provided by software vendor entity 102.

In some implementations, the computing devices may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some implementations, the architecture 100 can be a distributed client/server system that spans one or more networks such as network 114. The network 114 can be a large computer network, such as a local area network (LAN), wide area network (WAN), the Internet, a cellular network, or a combination thereof connecting any number of mobile clients, fixed clients, and servers. In some implementations, each client (e.g., computing devices 106, 116) can communicate with servers (e.g., computing devices 122, 126) via a virtual private network (VPN), Secure Shell (SSH) tunnel, or other secure network connection. In some implementations, the networks 112, 120 may include respective corporate networks (e.g., intranet) and one or more wireless access points.

Figure 2:
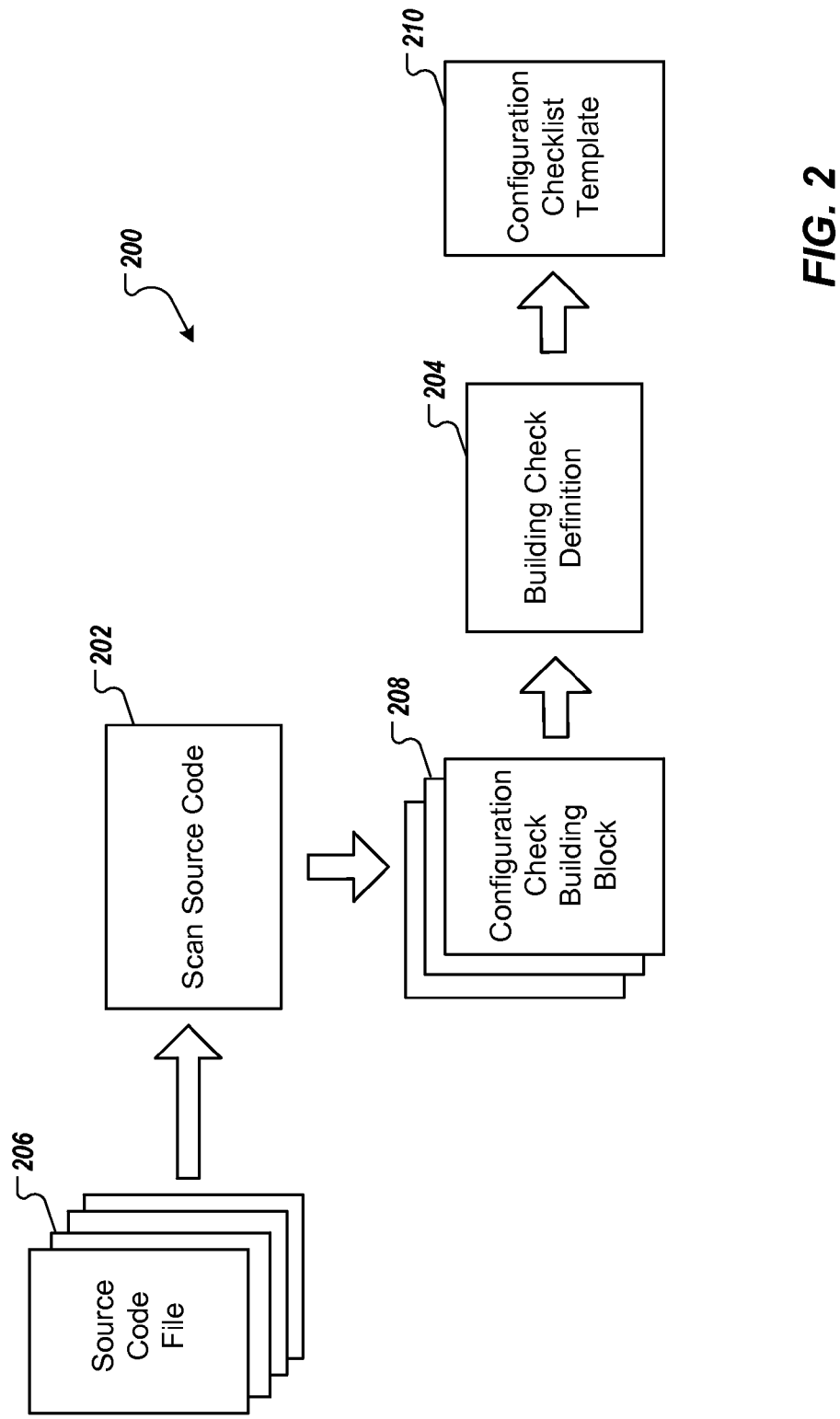
FIG. 2 is a block diagram of an example process for generating a configuration checklist template artifact in accordance with implementations of the present disclosure.

Referring now to FIG. 2, block diagram an example process 200 for generating a configuration checklist template artifact will be described. In some implementations, the generation of security configuration checklists can be provide as a two-step process, which can include an automated activity 202 (e.g., tool-based) and a manual activity 204. The example process 200 of FIG. 2 includes the activities 202, 204 and a plurality of artifacts 206, 208, 210. In some implementations, a software tool supporting the process 200 executes both activities 202, 204, and can be embedded into common integrated development environments (IDEs). An example IDE includes NetWeaver Developer Studio (NWDS), provided by SAP AG of Waldorf, Germany. In this manner, tool has access to relevant source code repositories, release information, source code, used configuration application program interfaces (APIs), XML schema validators, and the like.

The artifact 206 includes a source code file, which can be provided as the complete source code of a given software product, and for which a configuration checklist template is to be generated. The source code can be written in any computer programming language. However, access (i.e., read/write) to configuration information can be identifiable in an automated fashion (e.g. through the use of a certain configuration API, or by explicit annotation).

The artifact 208 includes a configuration check building block that represents a single checklist building block that can be used for the definition of actual check definitions. Examples of such building blocks include objects (e.g., a registry key or an environment variable), states (e.g., expressing potential values of objects), and simple tests (e.g., that test objects for their potential states). In some implementations, these building blocks can be created in an automated fashion, by scanning/pre-processing the entire source code. The following example can be considered:

```
Obj1           := registry(\HKEY_CURRENT_USER\SOFTWARE\XYZ\UseSSL)
Obj1State1     := 0 (false)
Obj1State2     := 1 (true)
Obj1Test       := (Obj1 EQ Obj1State1)
Obj2 :=
registry(\HKEY_CURRENT_USER\SOFTWARE\XYZ\SubmitCreditCardInfo)
Obj2State1     := 0 (false)
Obj2State2     := 1 (true)
Obj2Test       := (Obj2 EQ Obj2State1)
```

This example code illustrates respective check building blocks, provided as objects, states, and simple tests for the objects. The objects include a registry key holding a particular security setting. The states include different potential values for an object's configuration setting. The check building blocks can be discovered by code scanning and/or annotations, as discussed herein. The check building blocks are combined and considered in check definitions, discussed in further detail below.

The artifact 210 includes a configuration checklist template that represents the complete checklist for a software product. The configuration checklist is built out of check definitions, which represent logical expressions on the previously created building blocks. The configuration checklist also includes a textual description of security vulnerabilities that would result from a specific configuration. A definition is the element actually processed by a systems management tool, discussed in further detail below. If processing of a definition evaluates to true, a given vulnerability is present. If processing a definition evaluates to false, the target platform is securely configured. The generation of the configuration checklist can be a manual activity, as the generation is based on understanding the configuration parameter semantics and potential relationships. An example definition can be provided as:

```
Def1.logic := (!Obj2Test && Obj1Test)
Def1.description := The current configuration results in
sensitive data (credit card information) being transmitted in
clear text
Def1.assessment := Critical
```

The example definition would result in a security alert, if credit card information is submitted (e.g., to a backend server), but not encrypted due to the deactivation of a secure sockets layer (SSL).

With continued reference to FIG. 2, the activity 202 includes scanning of the source code file 206. The activity 202 is provided as an automated activity that pre-processes the source code and identifies all read access to all configuration settings. Write access can also be identified. The activity 202 generates a complete list of all configuration objects and their potential states, and outputs this list as one or more configuration check building blocks (i.e., artifact 208). In some implementations, the scanning can be based on explicit annotations that are embedded into the source code, and/or access to defined configuration APIs. The following example code illustrates an explicit annotation for a program call that reads a configuration setting from an environment variable:

```
@read_env(name=UseSSL, type=boolean, values=[0,1])
boolean bool = Boolean.valueOf(System.getProperty("UseSSL"));
```

Without an existing, explicit annotation (e.g., when pre-processing older source code), the use of defined APIs can be detected. An example API can include the class "java.util.Properties", which is commonly used to store configuration information. It is appreciated, however, that this example API is just one of multiple APIs that enable reading of configuration data that can be used to control security behavior. The following code fragment can be considered:

```
File f = new File("c:\Windows\config.properties");
Properties props = Properties.load(new InputStream(new
FileInputStream(f)));
int setting = Integer.valueOf(props.getProperty("UseSSL"));
switch(setting) {
    case 0: http_connection.useSSL(false); // unsecured connection
    case 1: http_connection.useSSL(true); // secured connection
}
```

Considering this example code fragment, it can be determined that a configuration parameter is read from a particular file, the configuration parameter having the type int, and having at least two potential values, which then determines whether a network connection is secured via SSL. This example code fragment illustrates how data and control flow analysis combined with a knowledge database describing relevant APIs (for configuration data sources, and configuration data targets) can be used to build the check building blocks. In general, a code scanning process to identify check building blocks can rely on a mixture of explicit annotations and data/control flow analysis.

With continued reference to FIG. 2, the activity 204 includes building check definitions using the configuration check building block(s) 208 provided from the activity 202. In particular, a skilled person can assess the various configuration settings and can create a meaningful check definition for each configuration setting according to a standard. An example standard includes the Open Vulnerability and Assessment Language (OVAL) standard. For example, a security expert can provide user input to select and associate one or more check building blocks to construct a check definition. The security expert can also provide user input that includes textual information. In this manner, each check definition is enriched with the textual information, which cannot be directly derived from source code. The textual information describes how a given configuration is relates to security and what can be done to provide a correct configuration. Accordingly, the activity 204 includes understanding the semantics, implications and dependencies of numerous configuration settings. The output of the activity 204 is the artifact 210, the configuration checklist template. The configuration checklist template includes one or more check definitions. For example, the security expert can provide further user input that indicates which check definitions are combined to provide a particular configuration checklist template.

In some implementations, multiple configuration checklist templates can be created based on the same configuration check building blocks. For example, a first configuration checklist template can be created as a baseline template (e.g., security baseline for standard security requirements). A second configuration checklist template can be created for higher requirements (e.g., increased security requirements relative to the security baseline). In such implementations, the input from the skilled person can include a selection and adoption of check definitions (e.g., check criticality=medium in security baseline template, and check criticality=high in advanced templates for elevated requirements) when building one or several configuration checklist templates.

Figure 3:
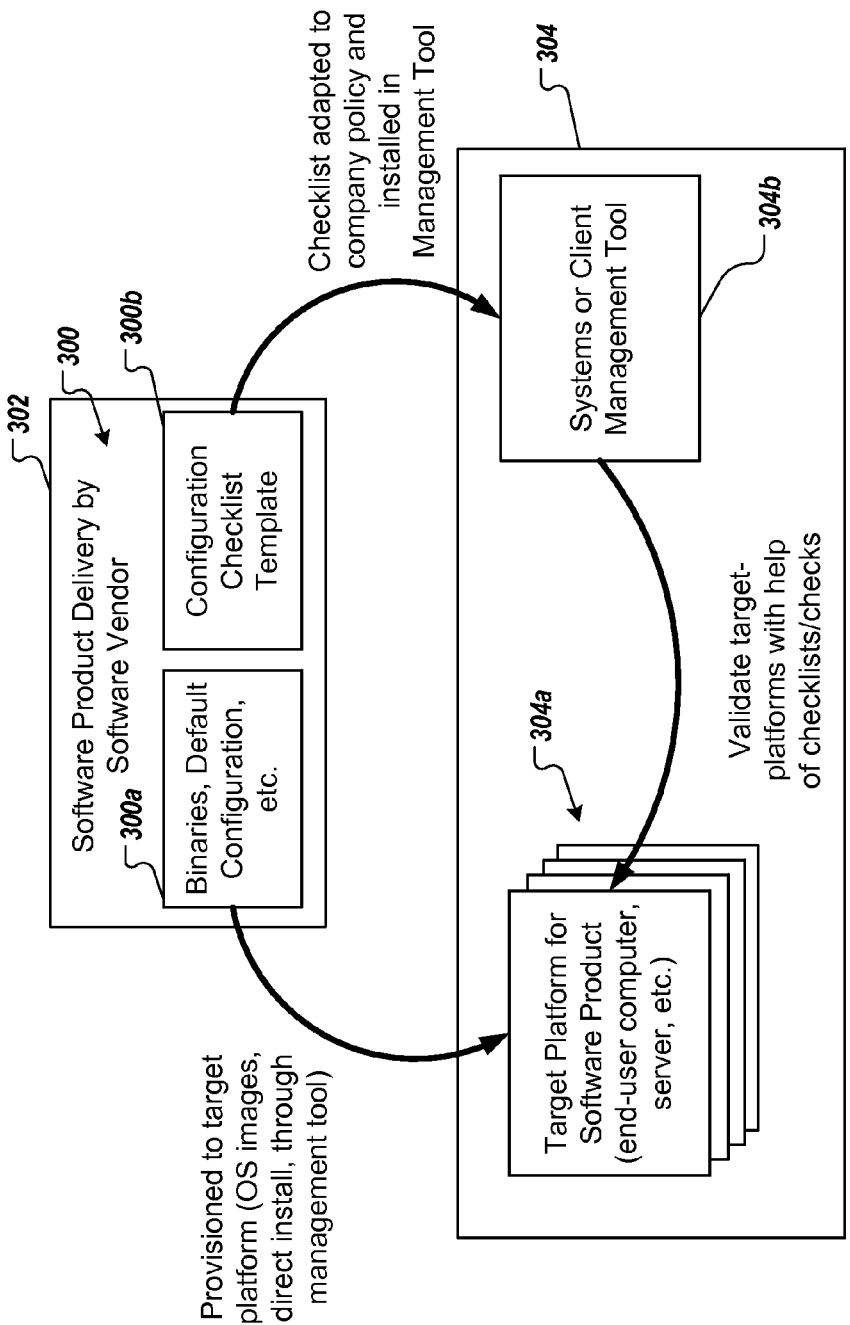
FIG. 3 is a block diagram of example artifacts provided by a software vendor to a customer.

Referring now to FIG. 3, a block diagram of example artifacts 300 provided by a software vendor 302 to a customer 304 will be described. In the example of FIG. 3, two types of artifacts 300 provided by the software vendor 302 can include a binaries and actual configuration artifact 300*a* and a configuration checklist template artifact 300*b*. In some implementations, the artifacts 300*a*, 300*b* are provisioned to different entities in an IT landscape of the customer 304. For example, the customer 304 can include target platform 304*a* for the software product (e.g., end-user computer, server) and a systems management tool 304*b*. Systems management tools are central solutions that actually manage systems, or clients in a productive system landscape, and offer features such as software provisioning (e.g., patch management), remote controlling, license monitoring and the like. An example systems management tool can include Solution Manager provided by SAP AG.

The binaries and actual configurations artifact 300*a* is ultimately installed on one or more of the target platform entities 304*a*. In particular, the binaries and actual configurations artifact 300*a* is provisioned to the target platform(s) 304*a* as operating system (OS) images, direct install or through a management tool. The configuration checklist template artifact 300*b* can be adapted to one or more policies of the customer 304 and is provisioned to the systems management tool 304*b*. By way of non-limiting example, generic software can be provided to Company A and Company B for supply management (e.g., the ordering of goods for some organization). Company A may use the software to order pencils. Consequently, the supply management software may not be so critical and the security configuration settings can be relaxed (e.g., checks for SSL are omitted from the checklist). Company B, on the other hand, may use the same software to order weapons. Consequently, the supply management software used at Company B requires a much more secure set-up (e.g., any data must be stored and transmitted in an encrypted fashion). Accordingly, the configuration checklist template artifact provided to Company A is adapted to Company A's relatively low-level security policies, while the configuration checklist template artifact provided to Company B is adapted to Company B's relatively high-level security policies. The configuration checklist template artifact 300*b* is managed and used by the systems management tool 304*b* to efficiently check the entire IT landscape of the customer 304 in an automated manner. In particular, the systems management tool 304*b* can validate the target platforms 304*a* for security using the adopted configuration checklist template artifact 300*b*.

Figure 4:
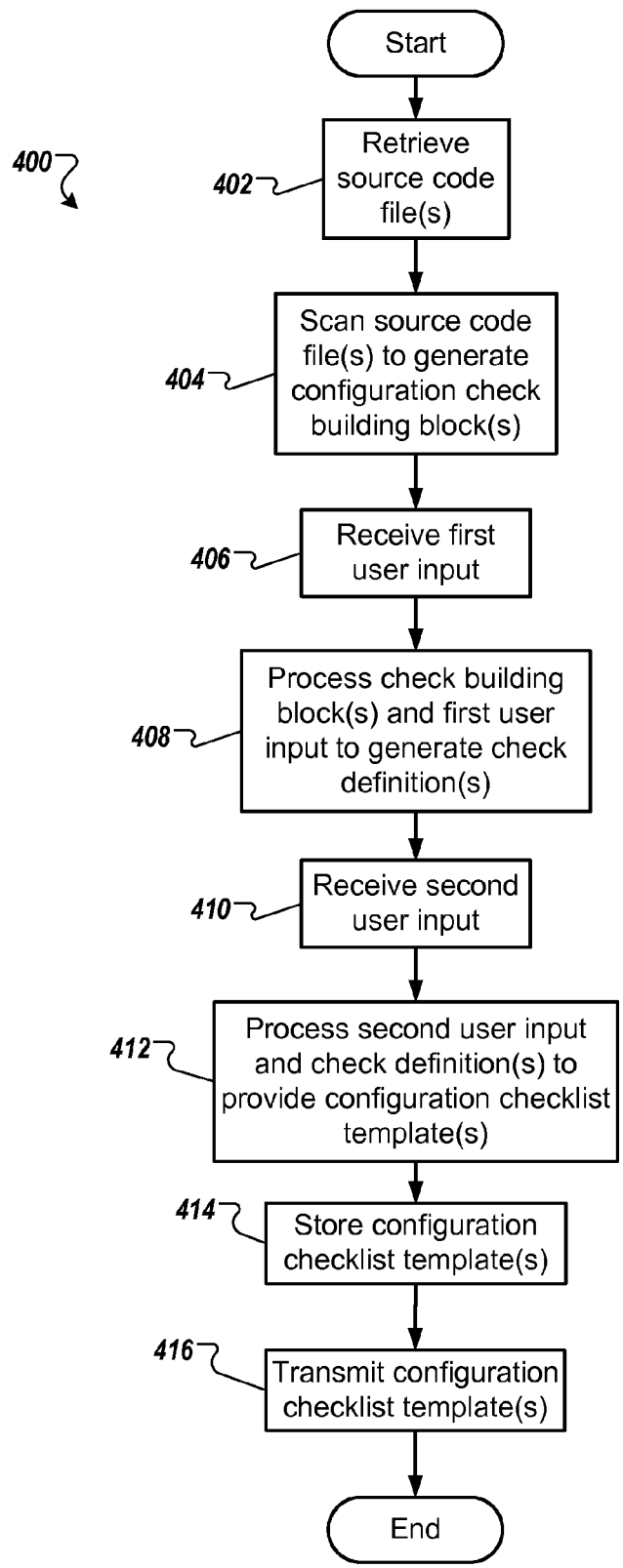
FIG. 4 is a flowchart depicting an example process that can be executed in accordance with implementations of the present disclosure.

FIG. 4 is a flow diagram of an example process 400 for generating a configuration checklist template. One or more source code files (e.g., source code files 206 of FIG. 2) is retrieved (402), each of the one or more source code files corresponding to a software product. For example, the source code files can be retrieved by a computing device (e.g., computing device 106 and/or 122 of FIG. 1) from a computer-readable storage medium (e.g., computer-readable storage device 124 of FIG. 1). The one or more source code files are scanned using one or more computing devices to generate one or more configuration check building blocks (e.g., configuration check building blocks 208 of FIG. 2) (404). For example, the computing device 106 and/or the computing device 122 of FIG. 1 can scan the one or more source code files to generate the configuration check building blocks.

First user input is received (406). For example, the computing device 106 and/or the computing device 122 of FIG. 1 can receive the first user input. The configuration check building blocks and the first user input are processed to generate one or more check definitions (408). For example, the computing device 106 and/or the computing device 122 of FIG. 1 can combine one or more configuration check building blocks based on the first user input to generate the one or more check definitions. Second user input is received (410). For example, the computing device 106 and/or the computing device 122 of FIG. 1 can receive the second user input. The check definitions and the second user input are processed to generate a configuration checklist template (412). For example, the computing device 106 and/or the computing device 122 of FIG. 1 can combine one or more check definitions based on the second user input to generate the configuration checklist template. As noted above, user input can be processed to generate multiple configuration checklist templates (e.g., a baseline template and a more advanced template). The configuration checklist template is stored in a computer-readable storage medium (e.g., computer-readable storage device 124 of FIG. 1) (414). The configuration checklist template is transmitted to one or more computing devices (e.g., computing devices 116 and/or 126 of FIG. 1) associated with a customer entity over a network (e.g., one or more of networks 112, 114, 120 of FIG. 1) (416).

The automated or semi-automated generation of ready-to-use configuration checklist artifacts, and their provisioning by software vendors, gives system and security administrators a jump-start in the validation of systems and clients in complex IT landscapes. Auto-generated configuration checklist artifacts decrease the costs of existing validation processes that often rely on proprietary solutions, or ignore configuration validation entirely, while increasing the security posture of client and server systems. The technique is applicable for any software, regardless of whether it runs on the client (i.e., front-end systems) or server (i.e., back-end systems).

Figure 5:
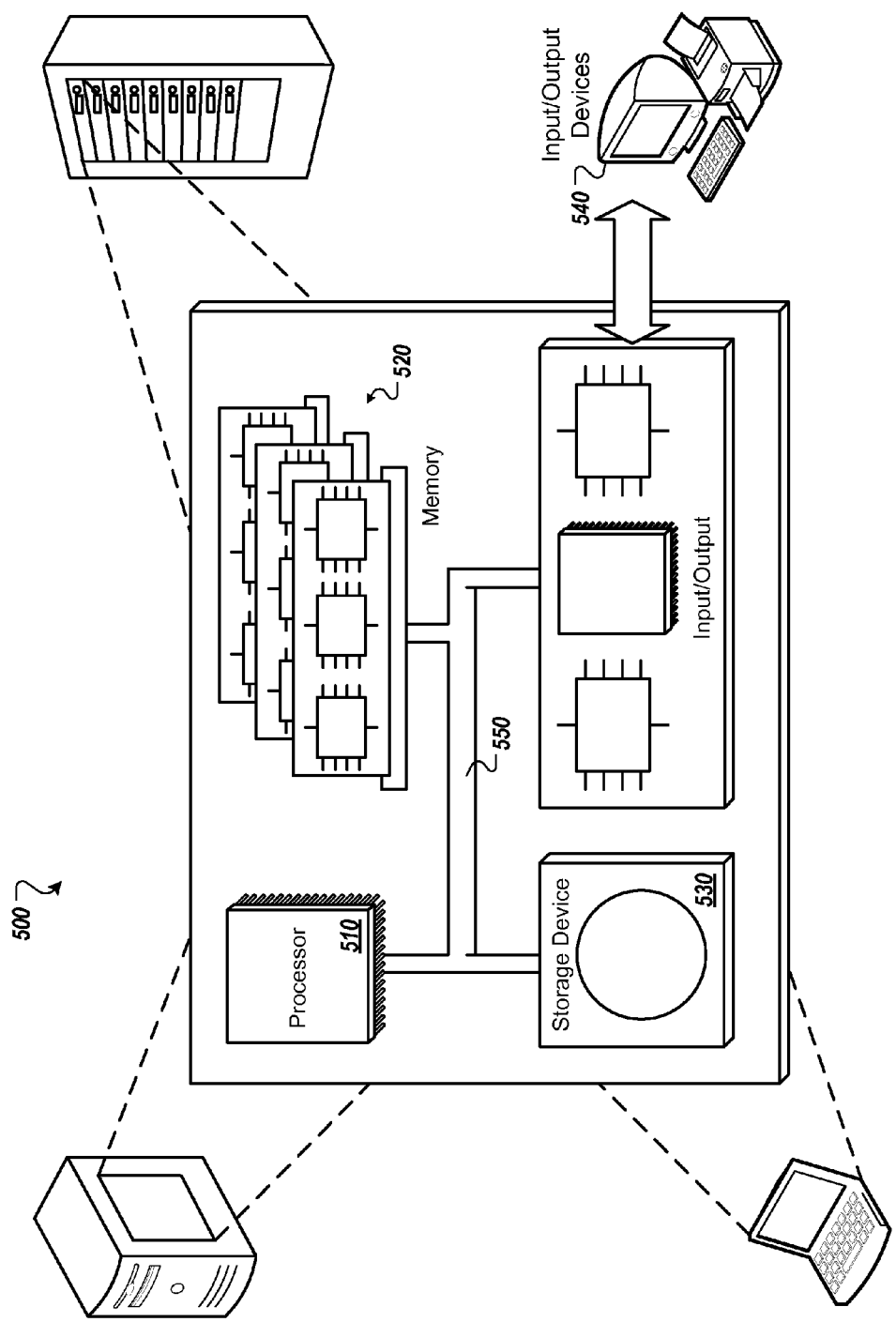
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for generating a configuration checklist template, the method comprising:
    retrieving one or more source code files, each of the one or more source code files corresponding to a software product and comprising configuration information;
    scanning the one or more source code files using one or more computing devices to identify the configuration information and to automatically generate one or more configuration check building blocks comprising a list of one or more configuration objects and one or more potential states associated with each of the one or more configuration objects and at least one of a configuration object, a potential state associated with a configuration object and a test for testing configuration objects;
    receiving first user input;
    processing the one or more configuration check building blocks and the first user input to generate one or more check definitions;
    receiving second user input;
    processing the one or more check definitions and the second user input to generate the configuration checklist template;
    electronically storing the configuration checklist template in a computer-readable storage medium; and
    transmitting the configuration checklist template to one or more computing devices associated with a customer entity over a network.

2. The method of claim 1, wherein scanning comprises scanning the one or more source code files to identify read and write access to each configuration setting provided in the one or more source code files.

3. The method of claim 1, wherein transmitting further comprises transmitting one or more software product artifacts to the customer entity over the network, the one or more software product artifacts being installable on a target platform of the customer.

4. The method of claim 1, wherein each of the one or more check definitions comprises a textual description of security vulnerabilities associated with one or more configuration objects.

5. The method of claim 1, wherein each of the one or more check definitions corresponds to a standard.

6. The method of claim 5, wherein the standard includes an Open Vulnerability and Assessment Language (OVAL) standard.

7. The method of claim 1, further comprising:
providing each of the one or more configuration check building blocks for display; and
receiving third user input, the third user input comprising textual information that cannot be directly derived from the one or more source code files, the textual information describing how a configuration relates to security, the one or more check definitions including the textual information.

8. The method of claim 1, wherein scanning is based on explicit annotations that are embedded into each of the one or more source code files.

9. The method of claim 1, wherein scanning is based on accessing to one or more defined configuration application program interfaces (APIs) determinable from the one or more source code files.

10. A non-transitory computer-readable storage medium coupled to one or more processors and having instructions stored thereon which, when executed by the one or more processors, cause the one or more processors to perform operations for generating a configuration checklist template, the operations comprising:
retrieving one or more source code files, each of the one or more source code files corresponding to a software product and comprising configuration information;
scanning the one or more source code files using one or more computing devices to identify the configuration information and to automatically generate one or more configuration check building blocks comprising a list of one or more configuration objects and one or more potential states associated with each of the one or more configuration objects and at least one of a configuration object, a potential state associated with a configuration object and a test for testing configuration objects;
receiving first user input;
processing the one or more configuration check building blocks and the first user input to generate one or more check definitions;
receiving second user input;
processing the one or more check definitions and the second user input to generate the configuration checklist template;
electronically storing the configuration checklist template in a computer-readable storage medium; and
transmitting the configuration checklist template to one or more computing devices associated with a customer entity over a network.

11. A system, comprising:
a computing device; and
a non-transitory computer-readable storage device coupled to the computing device and having instructions stored thereon which, when executed by the computing device, cause the computing device to perform operations for generating a configuration checklist template, the operations comprising:
retrieving one or more source code files, each of the one or more source code files corresponding to a software product and comprising configuration information;
scanning the one or more source code files using one or more computing devices to identify the configuration information and to automatically generate one or more configuration check building blocks comprising a list of one or more configuration objects and one or more potential states associated with each of the one or more configuration objects and at least one of a configuration object, a potential state associated with a configuration object and a test for testing configuration objects;
receiving first user input;
processing the one or more configuration check building blocks and the first user input to generate one or more check definitions;
receiving second user input;
processing the one or more check definitions and the second user input to generate the configuration checklist template;
electronically storing the configuration checklist template in a computer-readable storage medium; and
transmitting the configuration checklist template to one or more computing devices associated with a customer entity over a network.

* * * * *